United States Patent Office 3,746,592
Patented July 17, 1973

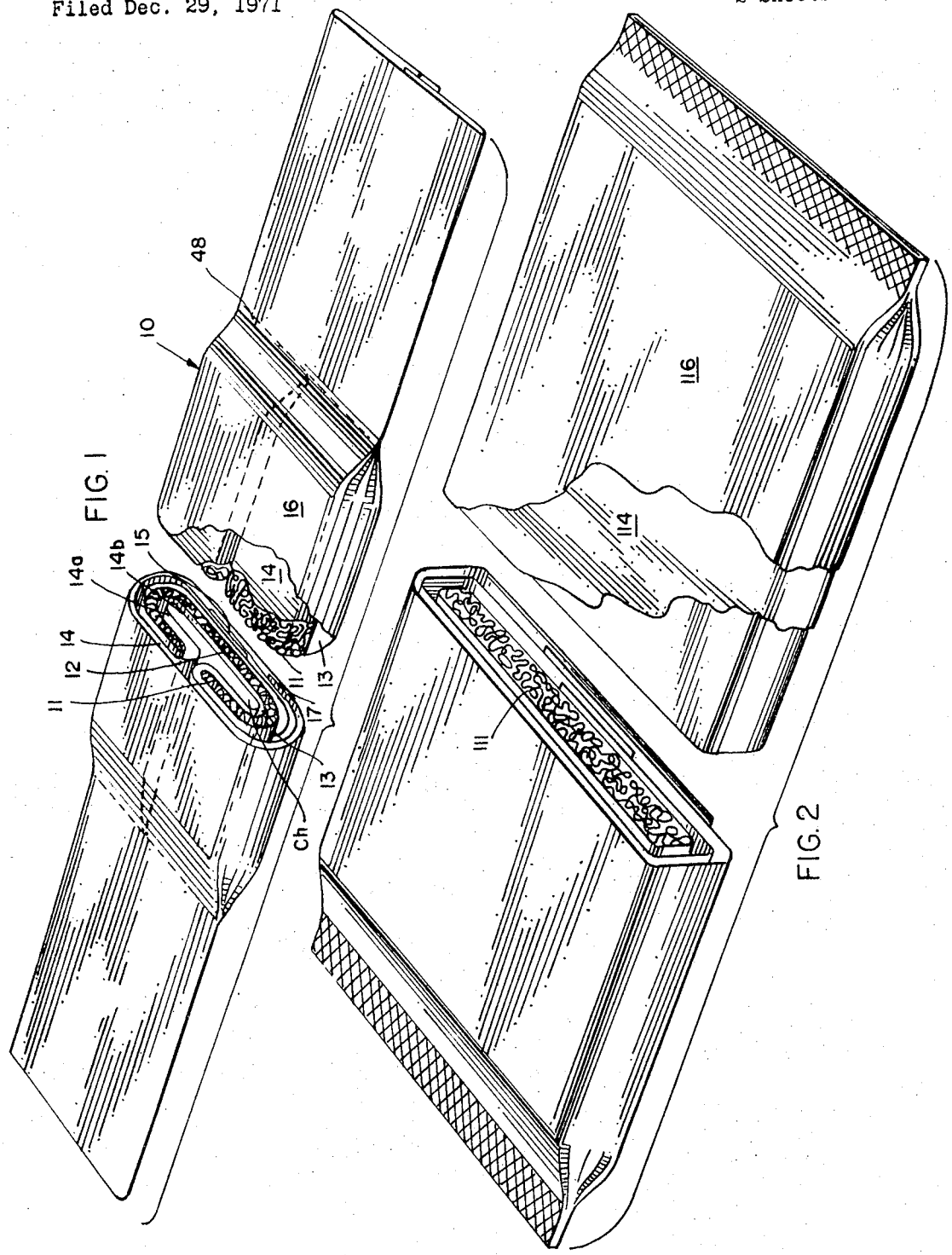

3,746,592
METHOD OF PRODUCING SANITARY NAPKINS
Ernst Daniel Nystrand and Brian H. McIntosh, Green Bay, Wis., assignors to Paper Converting Machine Company, Green Bay, Wis.
Original application Apr. 28, 1970, Ser. No. 32,560, now Patent No. 3,667,468. Divided and this application Dec. 29, 1971, Ser. No. 213,768
Int. Cl. B32b 7/00
U.S. Cl. 156—202                                    4 Claims

ABSTRACT OF THE DISCLOSURE

A sanitary napkin which has a fluff layer sandwiched between carrier layers, the sandwich being C-folded to provide a lined channel on one side of the sandwich which encourages more even, rapid, and complete dispersion of body fluids. By arranging the various elements of the apparatus for producing the napkin in a predetermined way, it is possible to alternatively produce diaper inserts.

---

This application is a division of application Ser. No. 32,560, filed Apr. 28, 1970, now Pat. No. 3,667,468, issued June 6, 1972.

BACKGROUND AND SUMMARY OF INVENTION

Although dispersion means have been employed in the past in sanitary napkins—for the purpose of orienting dispersion along the napkin length rather than saturating one central area—these not only have failed to achieve the foregoing objectives, but also have been difficult to produce continuously at high speed and of uniform quality. Through the idea of providing a channel, as by C-folding the fluff, we have achieved the foregoing objectives.

DETAILED DESCRIPTION OF INVENTION

The invention is described in conjunction with the accompanying drawings, in which:

FIG. 1 is a perspective view partially broken away of a sanitary napkin produced according to the teachings of this invention;

FIG. 2 is a perspective view also broken away to illustrate the type of diaper insert produceable according to the invention when the mechanism and method are modified somewhat;

Figure 3:
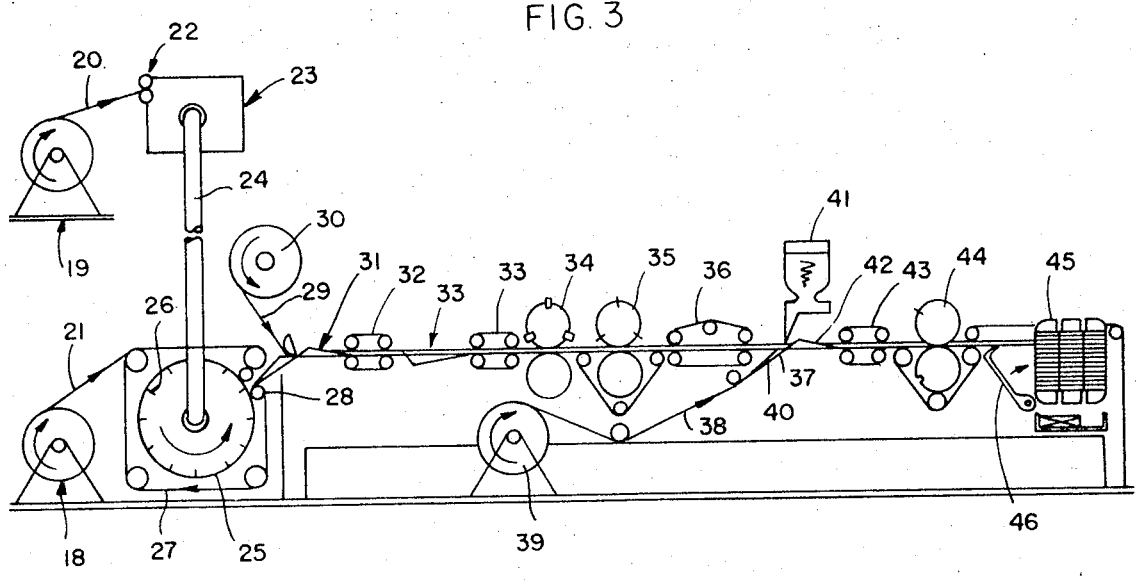
FIG. 3 is a side elevational view of a schematic representation of the apparatus arrangement for producing sanitary napkins.

In the illustration given, and with reference to FIG. 1, the numeral 10 designates generally a sanitary napkin produced and constructed according to the teachings of this invention. It will be noted that the core of the napkin is a fluff layer 11 which has been folded on itself into a C configuration. Adjacent the bight portion 12 of the C configuration is positioned a barrier sheet 13, advantageously polyethylene. The width of the barrier sheet 13 is less than that of the unfolded fluff layer 11. The fluff layer 11 and barrier sheet 13 are enclosed within a carrier web 14 which, before C-folding, makes up a sandwich with the carrier web 14 providing the external layers and the fluff 11 providing the inner layer. It will be noted by reference to FIG. 1 that the carrier web is overlapped on itself as at 15. Lastly, the C-folded sandwich is positioned within an enveloping outer wrap 16. This is overlapped on itself and longitudinally sealed together as at 17.

Thus we provide a single ply cellulose fluff pad overwrapped completely with a porous tissue carrier web. The narrower strip of polyethylene 13 introduced next to the fluff under the carrier web flaps acts as a barrier sheet on the finished napkin. The entire pad and carrier web are C-folded to form a modified two-ply construction with a longitudinally extending center channel. The entire C-folded fluff pad and carrier web are overwrapped, as at 16, advantageously with nonwoven material or wet strength tissue, and longitudinally sealed, as at 17, with a hot melt adhesive seam.

In operation, the C-fold construction with internal dispersion layers, i.e., the internal carrier webs, as at 14a and 14b, encourages more even, rapid, and complete dispersion of body fluids. The C-fold channel Ch (still referring to FIG. 1) orients the body fluid dispersion path along the length of the napkin, and discourages over-saturation in one central area. Thus, the non-woven overwrap 16 in contact with the body tends to remain drier. Further, the construction depicted resists "strike through" better than conventional two-ply napkins. By virtue of the C-fold construction, there is a compression of the various layers along the longitudinal edges which inhibits lateral leakage.

Referring now to FIG. 3, apparatus for producing the sanitary napkin of FIG. 1 is illustrated in somewhat schematic form. Starting the description from the extreme left, the numeral 18 designates generally a carrier tissue web unwind section. Advantageously this unwind is an "A" frame open-face unwind stand with friction strap brake, manual side shift control expanding spindle, and arranged to handle rolls of substantial diameter and width, i.e., 36" diameter up to 14" wide when wound on 3" I.D. cores. A second unwind section, generally designated 19, is provided for the pulp sheet 20. The unwind section 19 is essentially similar to that provided at 18 for the carrier web 21. The numeral 22 in FIG. 3 designates a set of variable speed knurled draw rolls which are operative to draw the pulp web 20 into a hammermill generally designated 23. The mill is operative to break the web 20 into shreds or fibers which are forced along a pipe 24 into a forming drum 25. Additional details on the construction of the forming drum and associated equipment can be seen by reference to Nystrand and Broeren application Ser. No. 842,146, filed July 16, 1969.

The fluff-forming drum 25 includes two side members spaced apart to provide a five and a half inch peripheral opening. Spacer blocks for 8" long pads are included as at 26. The spacer blocks are ½" wide in the illustration given, so that there is a ½" space between longitudinally successive pads laid down on the carrier web 21. A wire screen belt 27 surrounds the peripheral surface of the fluff drum 25 over the above-mentioned five and a half inch wide opening, and is driven by the drum. The carrier sheet is between the cylinder and the screen, so that the fluff pad is formed on the carrier web 21.

As the carrier web exits from the drum 25 over the roll 28, the fluff pads are spaced along its longitudinal center having, in the illustration given, dimensions of 8" x 5½". The carrier web itself in this illustration has a width of 14". Thus there is provided sufficient longitudinal edge width to develop the lapped arrangement designated 15 in FIG. 1.

Alternatively, a continuous web of fluff may be used. This is accomplished by the elimination of spacer blocks in the drum.

Prior to folding the carrier web 21 about the fluff layer developed from the web 20, we introduce a barrier sheet 29. A suitable unwind for the roll of barrier sheet 30 is provided over the fluff drum to support a 5½" wide elongated sheet 29.

After the barrier sheet (such as polyethylene) 29 is applied to the upwardly facing fluff layers, the three-part assembly engages a forming or folding section generally designated 31 which brings the longitudinal edge portions of the carrier web 21 over the upper face of the barrier sheet 29 to develop a sandwich-like construction when viewed in transverse section. At this stage, in the illustration given, the sandwich has a width of about 5½". Insuring that this continuous assembly proceeds along the predetermined path provided by the machine is a set of pull belts 32 which direct the sandwich assembly into a C-fold mechanism generally designated 33. This results in folding the longitudinal side edges of the sandwich under the sandwich proper to develop a C fold. Proceeding further along the aforementioned path, additional pull belts are encountered which direct the C-folded assembly into a cross seal embosser 34. In the illustration given, this pinches the C-folded web together to compress and contour the fluff pad ends, after which the assembly is directed into a transverse cut-off mechanism 35. The cut-off mechanism 35 results in the provision of discrete segments of napkin portions which are introduced into the nip defined by speed-up pull belts 36.

At the output of the speed-up belt arrangement 36, the discrete napkin portions are delivered into a partially folded outer wrap web as at 37. The as yet unfolded web 38, which becomes the partially folded web 37, is unwound from a suitable roll as at 39, and is partially formed by means of a former 40. A seam of adhesive is laid down on one fold of the web 38 by means of a hot melt extruder 41, the same having previously been designated 17 in FIG. 1. Thereafter the assembly encounters a further folding means 42 which results in folding the side edges of the overwrap web 38 into lapped condition as at 17 in FIG. 1. By virtue of the speed-up pull belts 36, the discrete napkin portions are advanced along the machine path at a speed greater than the travel of the carrier web 21 induced by the pull belts 32. Further pull belts, as at 43, are employed for advancing the now completed napkin stream and introduce the same into a cut-off mechanism 44. This mechanism employs a vacuum roll to support the transversely severed portions of the stream, while introducing the same into a delivery apparatus 45. The numeral 46 designates a trailing tail tucker which folds the trailing tail as shown in FIG. 1 into longitudinally over-folded relation with respect to the enthickened central portion of the pad. The leading tail, as at 47, is folded rearwardly along the line 48 incident to the movement of the sanitary pad into the delivery mechanism 45.

Figure 4:
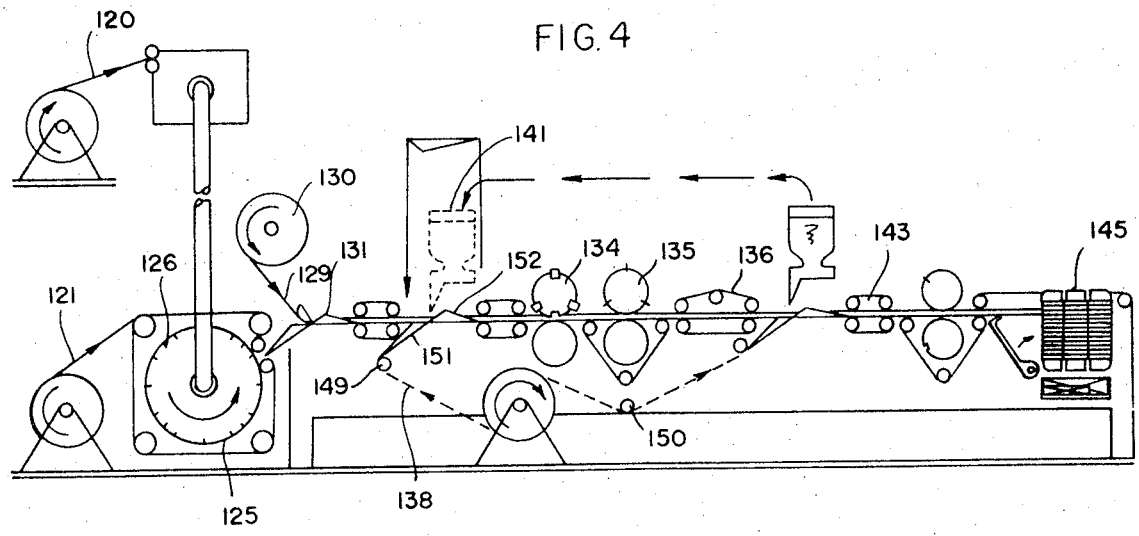
FIG. 4 is a view similar to FIG. 3, but showing the apparatus modified for alternatively producing diaper inserts.

Reference is now made to FIGS. 2 and 4. The arrangement is a modification of that just described, but with certain machine arrangements and omissions. For example, in FIG. 2, we provide an outer wrap 116 which envelops the carrier web 114, which in turn sandwiches the fluff layer 111. If no barrier sheet is desired when making diaper inserts, the sheet roll 130 is not employed. However, the arrangement in FIG. 4 can be readily converted to making sanitary napkins.

Referring now to FIG. 4, it is seen that a carrier web 121 is provided, as is a pulp web 120. The operation of the forming drum 125 is as described in conjunction with the apparatus of FIG. 3, except that the cross bars 126 may be provided on different centers so as to develop different lengths of diaper. It will be noted that the former 131 for the folding of the longitudinal side edges of the web 121 about the fluff layer provided by the web 120 is spaced sufficiently away from the forming drum so as to accommodate the interposition of the barrier sheet 129 if needed. In the event diaper inserts are made, the outer wrap web 138 is directed rearwardly and around an idler roll 190 (as contrasted to the idler roll 150 which is employed for the operation of the machine when making sanitary napkins). The former 33 is changed, and substituted therefor are forming means 151 and 152 which correspond essentially to the formers 40 and 42 of FIG. 3. Also, the extruder 41 is relocated to the dotted line position designated 141 in FIG. 4. When using embosser 134 for sanitary napkins, we employ a 3 x 8"=24" circumference roll with three smooth rounded bars to compress and contour the ends of the napkins. For diaper inserts this roll becomes two time for two twelve-inch pads, with two engraved bars having a pattern suitable for sealing the ends of the pads to avoid leakage of fluff through the ends. Here the sandwich, including the fluff, is crushed by means of high unit pressure on the high parts of the engraved bars. The cut-off 135 is three time for sanitary napkins and two time for the diaper inserts. The severed pads are then delivered to the delivery section 145..

Alternatively, it is also, of course, possible to produce C-folded diaper inserts with or without the barrier sheet by a few modifications of the above machine. Here the channel gives the additional advantage of being more accommodating for the male baby.

We claim:

1. A method of producing sanitary napkins comprising the steps of applying a layer of fluff to the longitudinally central portion of an elongated carrier web, folding the longitudinal edges of said web onto said fluff layer to form a sandwich wherein said fluff layer is completely enveloped in said carrier web, and thereafter folding said sandwich on itself along parallel spaced-apart longitudinally extending lines to form a C-folded napkin having upper and lower portions separated by a double thickness of said carrier web.

2. The method of claim 1 in which a barrier sheet is applied to said fluff prior to folding the longitudinal edges of said carrier web.

3. The method of claim 1 in which an elongated outer wrap web is applied to the C-folded sandwich, said outer wrap web being wider than said C-folded sandwich to provide free longitudinal edge portions, said free longitudinal edge portions being folded about said C-folded sandwich.

4. The method of claim 1 in which the carrier web of said C-folded sandwich is trasversely severed along longitudinally spaced apart lines prior to folding said overwrap web thereon to provide discrete napkin portions, thereafter advancing the discrete napkin portions at a speed faster than the unsevered carrier web to longitudinally space the discrete napkin portions, and transversely severing the overwrap web in the space between discrete napkins portions.

References Cited
UNITED STATES PATENTS

| 3,364,931 | 1/1968 | Hirsch | 128—290 R |
|---|---|---|---|
| 3,525,338 | 8/1970 | Bernardin | 128—290 R |
| 3,661,680 | 5/1972 | Gore | 156—467 |
| 3,441,023 | 4/1969 | Rijssenbeek | 128—287 |
| 3,230,955 | 1/1966 | Joa et al. | 128—290 R |
| 3,559,649 | 2/1971 | Grad | 128—290 R |

ALFRED L. LEAVITT, Primary Examiner

B. J. LEWRIS, Assistant Examiner

U.S. Cl. X.R.

156—201, 213, 227, 204, 253